(12) United States Patent
Freudelsperger

(10) Patent No.: US 7,878,320 B2
(45) Date of Patent: Feb. 1, 2011

(54) DIRECTIONAL CHANGE TWIN-BELT CONVEYOR

(75) Inventor: Karl Freudelsperger, Hart bei Graz (AT)

(73) Assignee: Knapp Logistik Automation GmbH, Hart bei Graz (AT)

( * ) Notice: Subject to any disclaimer, the term of this patent is extended or adjusted under 35 U.S.C. 154(b) by 97 days.

(21) Appl. No.: 11/910,019

(22) PCT Filed: Apr. 20, 2006

(86) PCT No.: PCT/EP2006/003607
§ 371 (c)(1),
(2), (4) Date: Sep. 28, 2007

(87) PCT Pub. No.: WO2006/114234
PCT Pub. Date: Nov. 2, 2006

(65) Prior Publication Data
US 2008/0190741 A1   Aug. 14, 2008

(30) Foreign Application Priority Data
Apr. 23, 2005   (DE) ................ 10 2005 019 067

(51) Int. Cl.
*B65G 21/20* (2006.01)
(52) U.S. Cl. .............. 198/597; 198/831; 198/861.3; 198/626.1
(58) Field of Classification Search ............ 198/831, 198/597, 457.02, 599, 861.3; 193/35 R
See application file for complete search history.

(56) References Cited

U.S. PATENT DOCUMENTS

| 3,507,379 | A | * | 4/1970 | Johnston ............... 198/787 |
| 3,596,706 | A | * | 8/1971 | Knorr et al. ............ 164/448 |
| 5,083,655 | A | * | 1/1992 | Becker ................ 198/460.1 |
| 5,143,200 | A | * | 9/1992 | Fuller ................... 198/453 |
| 5,503,263 | A | * | 4/1996 | Watanabe .............. 198/442 |
| 6,003,659 | A | * | 12/1999 | Uranaka et al. ....... 198/626.1 |
| 6,598,729 | B2 | * | 7/2003 | Marsetti et al. ......... 198/452 |

FOREIGN PATENT DOCUMENTS

| DE | 100 55 574 A1 | 12/2001 |
| DE | 202 10 975 U1 | 1/2003 |
| FR | 2 842 794 A1 | 1/2004 |

* cited by examiner

*Primary Examiner*—Gene Crawford
*Assistant Examiner*—Kavel P Singh
(74) *Attorney, Agent, or Firm*—McGlew and Tuttle, P.C.

(57) ABSTRACT

A directional-change conveyor (1) is provided for conveying piece goods (2) along a first conveying strip and a second conveying strip oriented in a different direction. A transfer structure (3) is provided for transferring conveyed piece goods from the first to the second conveying strip. The first and second conveying strips are twin-belt conveyors (4, 5). The transfer structure (3) is provided with tilted non-driven guide rollers (11) in an angle sector (10) between the two revolving belts (6, 7) of the first twin-belt conveyor (4). The lateral revolving belts (6, 7; 8, 9) of the two twin-belt conveyors (4, 5) are provided as the only drive of the conveyor (1). The tilted non-driven (first) guide rollers (11) are the exclusive deflection elements in the angle sector (10) and deflect conveyed piece goods (2) from the first twin-belt conveyor (4) on a curved strip to the second twin-belt conveyor (5).

10 Claims, 3 Drawing Sheets

DIRECTIONAL CHANGE TWIN-BELT CONVEYOR

CROSS REFERENCE TO RELATED APPLICATIONS

This application is a United States National Phase application of International Application PCT/EP2006/003607 and claims the benefit of priority under 35 U.S.C. §119 of German Patent Application DE 10 2005 019 067.7 filed Apr. 23, 2005, the entire contents of which are incorporated herein by reference.

FIELD OF THE INVENTION

The present invention pertains to a conveying means or conveying device with change in direction for conveying individually packaged products along a first conveying section and a differently directed, second conveying section, as well as a transfer device for transferring delivered individually packaged products from the first to the second conveying section, wherein the first conveying section and the second conveying section are twin-belt conveyors with two lateral, endlessly driven circulating belts each, wherein the second twin-belt conveyor directly joins the longitudinal end of the first twin-belt conveyor laterally at an angle and the longitudinal end of the circulating belt of the first twin-belt conveyor extends in the angle area into the extension of the conveyor track of the second twin-belt conveyor at least up to the middle of the conveyor track of the second twin-belt conveyor, and obliquely directed, non-driven guide rollers are provided in the angle area between the two circulating belts of the first twin-belt conveyor.

BACKGROUND OF THE INVENTION

In prior-art transfer devices, the transfer between longitudinal and cross conveyors in the form of chain, twin-belt, single-belt or roller conveyors takes place by means of rotary tables, which pick up the individually packaged product or the carrier for the individually packaged product, such as a container or pallet, when the rotary table is stopped and slowly pivot it about the center of the individually packaged product or along an arc into the release direction of the second conveying section in order to release the individually packaged product there. Curved pieces are also known in roller conveyors, which themselves have cylindrical cross rollers and a lateral guide. The rollers are driven in order to support a change in direction of the individually packaged product in the curve. The change in direction is brought about preferably by the lateral guide, which prevents the individually packaged product from running off the curved path.

SUMMARY OF THE INVENTION

The basic object of the present invention is to provide a twin-belt conveying device with change in direction of the type mentioned in the introduction, whose transfer device has a very simple design and nevertheless can be operated reliably.

The essence of the conveying device according to the present invention is that the lateral circulating belts of the two twin-belt conveyors are the only drive means of the conveying device and the obliquely directed, non-driven (first) guide rollers are provided exclusively as deflecting means in the angle area, which deflect the individually packaged product being conveyed from the first twin-belt conveyor on a curved path to the second twin-belt conveyor.

Additional (second) guide rollers of the type of the first guide rollers may preferably be provided as deflecting rollers also outside the angle area in the area of the longitudinal end of the second twin-belt conveyor, which end adjoins the first twin-belt conveyor, between the two circulating belts.

In an especially advantageous variant, the first and second guide rollers may be designed such that the projection and/or the position of the diverse axes of rotation of these guide rollers can be set.

The first and second guide rollers are especially narrow individual rollers made of rubber.

The first and second guide rollers are preferably accommodated and fastened in bottom plates of their own, which form an assembly unit.

The bottom plate preferably has recesses, through which the guide rollers slightly project upward with a projection and these guide rollers can be brought into a rolling guiding meshing with the bottom side of the individually packaged product.

A monitoring means may be provided, which monitors the travel of the individually packaged product in curves, especially the arc being traveled by the individually packaged product and/or stoppage of the individually packaged product. If an exceptional state develops, the conveying system can be automatically stopped and/or the exceptional state may optionally be automatically eliminated.

Even heavy individually packaged products can be conveyed or deflected by the present invention by means of the guide rollers from a twin-belt conveyor to another twin-belt conveyor along a curved path without a special drive being required for the rollers and without lateral guides being necessary for the individually packaged products along the curved path. Nevertheless, lateral limiting walls may be provided, which are, however, not in contact with the individually packaged product to be deflected during normal travel in a curve, but hold the individually packaged product on the curved path in case of an emergency only.

The individually packaged products are pushed off the first twin-belt conveyor during the operation at the inlet in the transfer device and deflected and pushed in the process by the obliquely directed non-driven guide rollers, which grasp them well on the bottom side, in the angle area until they are grasped by the second twin-belt conveyor and are pulled out of the transfer device. The curved path is determined in practice by setting the projection of the guide rollers and by setting the oblique position of the guide rollers, the oblique position optionally taking into account or compensating a lateral slip of the individually packaged product.

This is an amazingly simple, unforeseeable deflection method. If the guide rollers were driven in a complicated manner, guided deflection would possibly be imaginable for the average person skilled in the art because, similarly to a motor vehicle with front wheel drive, the individually packaged products would now be pulled directly into the curve.

A special advantage of the present invention is that the lateral guide plates according to the state of the art, which represent an extra design effort, on the one hand, and are associated with wear due to friction between the side wall and an individually packaged product, can be eliminated.

A switch can also be set according to the present invention in a simple manner depending on the oblique position of the guide rollers, because lateral guide plates according to the state of the art are not present and therefore no such plates have to be removed or overcome in another manner.

The advantage of the twin-belt conveying technique is utilized in the present invention concerning the possibility of integrating the additional transfer function in an especially simple manner.

In particular, it is only a plate acting as a bottom plate, which has integrated non-driven rubber rollers having adjustable direction, as a result of which the containers can be conveyed diagonally in a very simple manner. The deflection is especially a deflection by 90° along a curved path. The technique per se can be used for other curve radii as well. The container is pulled off by the twin belt on the pulling section from the non-driven roller area in a secured manner. The same applies to the feeding section. The container is pushed here onto the rollers by means of the twin-belt technique. The rollers with integrated rubber are used now to change the direction.

Other advantageous features of the present invention appear from the subclaims as well as the following description, in which preferred exemplary embodiments of the present invention will be explained in more detail on the basis of the drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
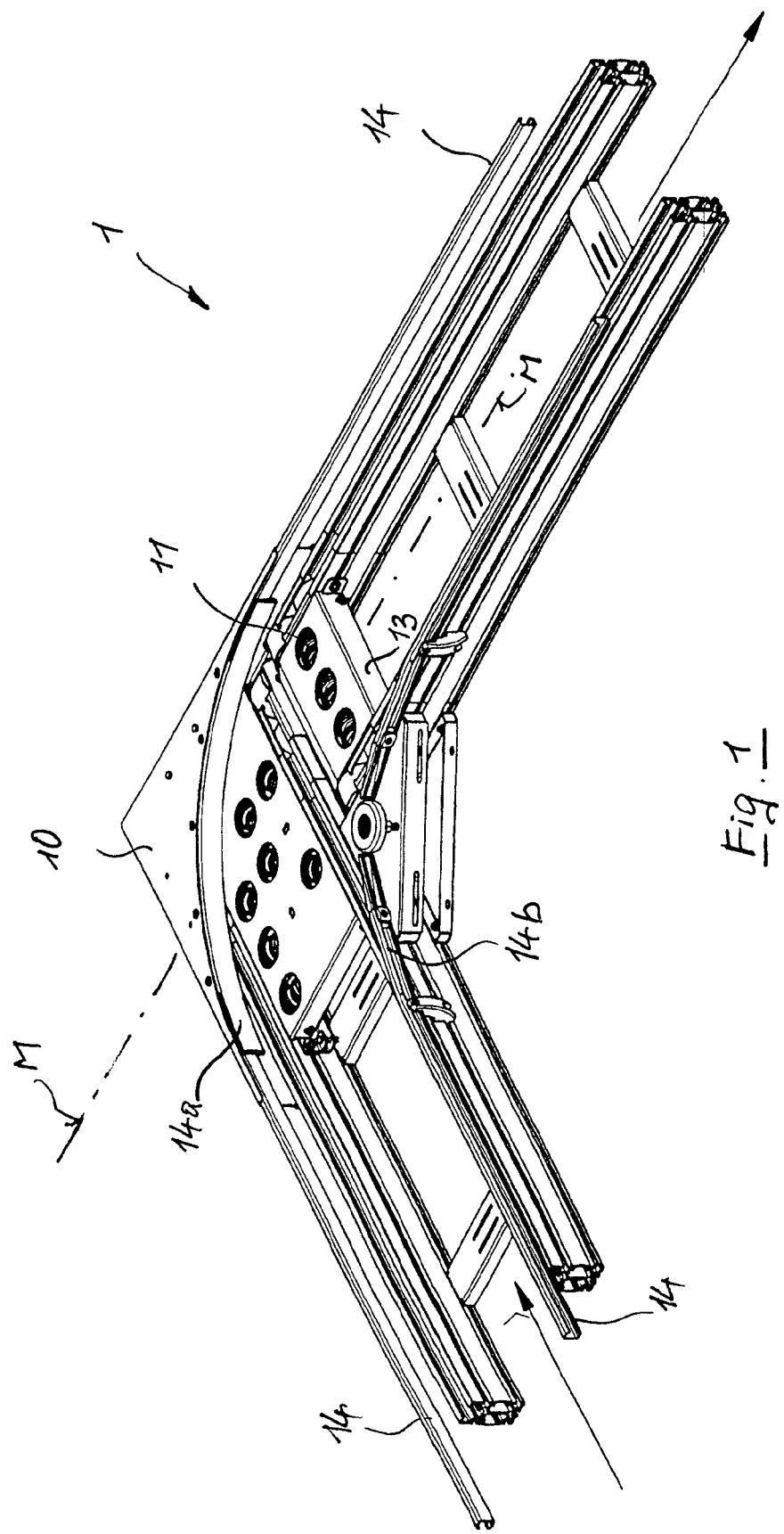
FIG. 1 is a schematic perspective view of an angular win-belt conveying device according to the present invention with a transfer device in the angle area.
Figure 2:
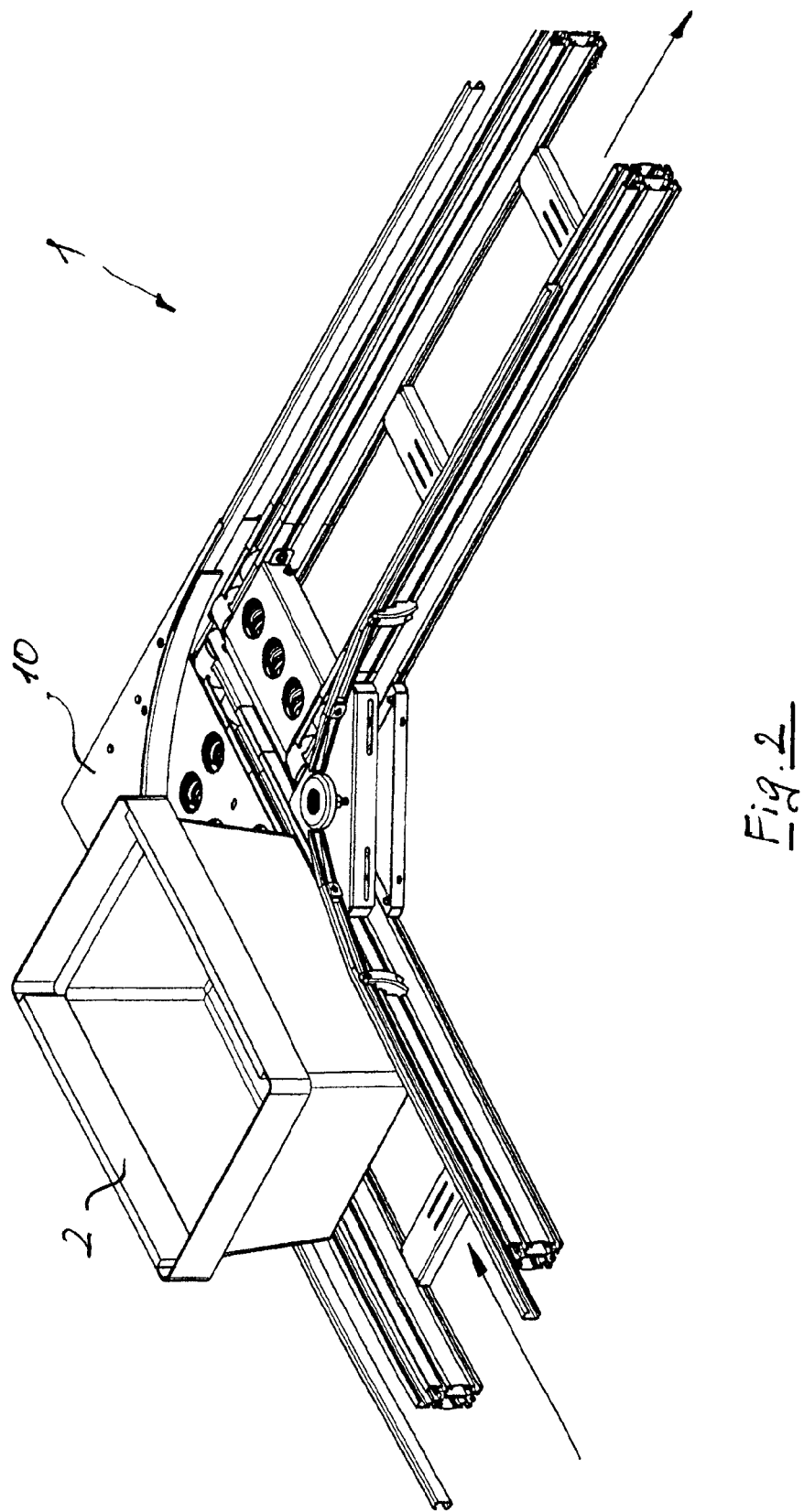
FIG. 2 is the conveying device according to FIG. 1 with an individually packaged product conveyed into the angle area.
Figure 3:
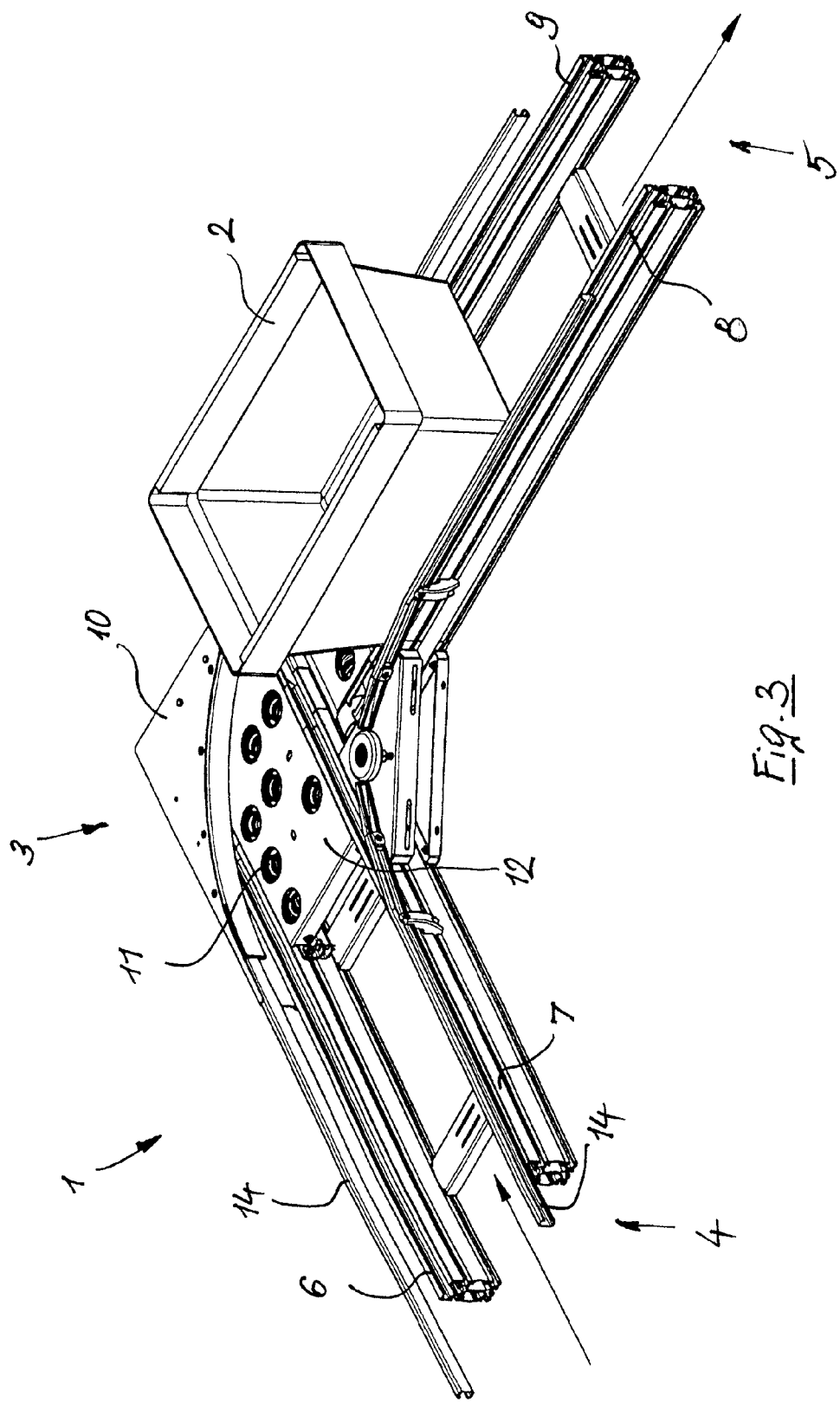
FIG. 3 is the conveying device according to FIG. 1 with an individually packaged product conveyed out of the angle area.

Referring to the drawings in particular, a conveying device 1 is provided with change in direction for conveying an individually packaged product 2 along a first conveying section and a differently directed, second conveying section. The conveying device 1 comprises a transfer device 3 for transferring an individually packaged product being conveyed from the first onto the second conveying section. The first and second conveying sections are twin-belt conveyors 4, 5 each with two lateral, endlessly driven circulating belts 6, 7; 8, 9.

The transfer device 3 is located essentially in an angle area 10, which is determined by the two longitudinal ends of the two twin-belt conveyors 4, 5, which longitudinal ends are directed towards each other.

In particular, the second twin-belt conveyor 5 directly adjoins the longitudinal end of the first twin-belt conveyor 4 laterally at right angles, the longitudinal end of the circulating belts 6, 7 of the first twin-belt conveyor 4 extending in the extension of the conveyor track of the second twin-belt conveyor 5 at least up to the middle M of the conveyor track of the second twin-belt conveyor.

Obliquely directed, non-driven guide rollers 11, which deflect an individually packaged product 2 being conveyed from the first twin-belt conveyor 4 on a curved path in the angle area 10 to the second twin-belt conveyor 5, are provided in the angle area 10 between the two circulating belts 6, 7 of the first twin-belt conveyor 4.

The guide rollers 11 are accommodated and fastened in a bottom plate 12 forming an assembly unit, the bottom plate being arranged in the angle area 10 at least partially between the two circulating belts 6, 7 of the first twin-belt conveyor 4.

In the exemplary embodiment shown in the drawings, the longitudinal end of the first twin-belt conveyor 4 is located at the outermost longitudinal edge of the second twin-belt conveyor 5 in the extension of the outer circulating belt 9.

In a variant, which is not shown, the longitudinal end of the first twin-belt conveyor preferably extends, however, only up to the middle M of the conveyor track of the second twin-belt conveyor 5 or just barely beyond it, without the conveying drive being appreciably compromised hereby in the curve. The free space in the extension of the circulating belt 7 of the first twin-belt conveyor 4, which said circulating belt 7 is adjacent to the second twin-belt conveyor 5, can now be used up to the outermost edge of the second twin-belt conveyor 5 for arranging additional guide rollers 11, which may likewise be integrated in the above-mentioned bottom plate 12.

Consequently, the longitudinal end of the circulating belts 6, 7 of the first twin-belt conveyor 4, in particular, can extend up to the middle M or just beyond the middle of the extension of the conveyor track of the second twin-belt conveyor 5, and at least one guide roller 11, which is aligned or nearly aligned with the conveyor track of the second twin-belt conveyor 5, may also be provided in the extension of the circulating belt 7 of the first twin-belt conveyor 4, which said circulating belt 7 is adjacent to the second twin-belt conveyor 5.

The bottom plate 12 has recesses, through which the guide rollers 11 slightly project upward by a projection and the guide rollers 11 can as a result be brought into a rolling guiding meshing with the bottom side of the individually packaged product 2.

The guide rollers 11 are rubber rollers and are designed especially as narrow individual rollers.

According to the drawings, additional guide rollers 11 of the above-mentioned type, which are located in a plate 13 in the manner of the bottom plate 12 and project on the top side, are also provided between the two circulating belts 8, 9 at the longitudinal end of the second twin-belt conveyor 5, which longitudinal end adjoins the angle area 10 of the first twin-belt conveyor 4.

The twin-belt conveying device 1 has, on the whole, a mostly linear lateral limiting wall 14 on both sides for the individually packaged product 2 in the direction of conveying. In the angle area 10 of the first twin-belt conveyor 4, the lateral limiting wall is formed by a circular arc 14a radially on the outside and by a circular arc 14b radially on the inside, which do not mesh with the side walls of the individually packaged product during the transfer of an individually packaged product and have only a retaining function in case of an emergency.

A monitoring means, which monitors the travel of the individually packaged product 2 in a curve, especially the arc over which the individually packaged product travels, and/or the stoppage of the individually packaged product, may be provided.

In one variant, the guide rollers 11 may be designed such that the projection and/or the position of the diverse axes of rotation can be set.

As can be seen, individually packaged products 2 can be transferred or deflected, with both twin-belt conveyors 4, 5 being driven only by the narrow, well-grasping guide rollers 11, which mesh in a punctiform manner only, from one twin-belt conveyor to another one along a curved path, without a special drive of the rollers being required and without lateral guides being necessary for the individually packaged products along the curved path. It is sufficient to push the individually packaged products 2 on the circulating belts 6, 7 of the first twin-belt conveyor 4 in the inlet area of the angle area 10, in the end area only on the circulating belt 7 according to the present invention, and to pull the individually packaged product 2 onto circulating belts 8, 9 of the second twin-belt conveyor at the outlet of the angle area 10.

While specific embodiments of the invention have been shown and described in detail to illustrate the application of the principles of the invention, it will be understood that the invention may be embodied otherwise without departing from such principles.

The invention claimed is:

1. A conveying device for conveying an individually packaged product, the conveying device comprising:
   a first conveying section comprising a first twin-belt conveyor with two lateral, endlessly driven circulating belts;
   a second conveying section comprising a second twin-belt conveyor with two lateral, endlessly driven circulating belts, said second conveying section being differently directed from said first conveying section for a change in direction of conveying, said second twin-belt conveyor directly adjoining a longitudinal end of said first twin-belt conveyor laterally at an angle and the longitudinal end of said circulating belts of said first twin-belt conveyor extends in an angle area into the extension of the conveyor track of said second twin-belt conveyor at least up to a middle of the conveyor track of said second twin-belt conveyor;
   a transfer device for transferring the individually packaged product being conveyed from the first conveying section to the second conveying section, said transfer device comprising obliquely directed, non-driven guide rollers provided in said angle area between the two circulating belts of said first twin-belt conveyor, said lateral circulating belts of each of said first twin-belt conveyor and said second twin-belt conveyor forming the only drive means of said conveying device, said obliquely directed, non-driven guide rollers defining an exclusive deflecting means in said angle area for deflecting the individually packaged product being conveyed from said first twin-belt conveyor on a curved path to said second twin-belt conveyor, said non-driven guide rollers being accommodated and fastened in a bottom plate as an assembly unit, said bottom plate being arranged in said angle area at least partially between said two circulating belts of said first twin-belt conveyor.

2. A conveying device in accordance with claim 1, further comprising:
   additional guide rollers of a type of said guide rollers, said additional guide rollers forming part of a deflecting means outside said angle area in the area of the longitudinal end of said second twin-belt conveyor, which adjoins said first twin-belt conveyor.

3. A conveying device in accordance with claim 1, wherein a degree of projection and/or a position of the diverse axes of rotation of said guide rollers can be set.

4. A conveying device in accordance with claim 1, wherein said guide rollers are narrow individual rollers made of rubber.

5. A conveying device in accordance with claim 4, wherein a lateral limitation in the form of a circular arc at least radially on the outside is provided for the individually packaged product in the direction of conveying in said angle area of said first twin-belt conveyor.

6. A conveying device in accordance with claim 1, wherein said first and second twin-belt conveyors extend at right angles to one another.

7. A conveying device in accordance with claim 1, further comprising a monitoring means for monitoring a travel of the individually packaged product in a curve over which said individually packaged product travels, and/or monitoring stoppage of said individually packaged product.

8. A conveying device for conveying an individually packaged product, the conveying device comprising:
   a first conveying section comprising a first twin-belt conveyor with two lateral, endlessly driven circulating belts;
   a second conveying section comprising a second twin-belt conveyor with two lateral, endlessly driven circulating belts, said second conveying section being differently directed from said first conveying section for a change in direction of conveying, said second twin-belt conveyor directly adjoining a longitudinal end of said first twin-belt conveyor laterally at an angle and the longitudinal end of said circulating belts of said first twin-belt conveyor extends in an angle area into the extension of the conveyor track of said second twin-belt conveyor at least up to a middle of the conveyor track of said second twin-belt conveyor;
   a transfer device for transferring the individually packaged product being conveyed from the first conveying section to the second conveying section, said transfer device comprising obliquely directed, non-driven guide rollers provided in said angle area between the two circulating belts of said first twin-belt conveyor, said lateral circulating belts of each of said first twin-belt conveyor and said second twin-belt conveyor forming the only drive means of said conveying device, said obliquely directed, non-driven guide rollers defining an exclusive deflecting means in said angle area for deflecting the individually packaged product being conveyed from said first twin-belt conveyor on a curved path to said second twin-belt conveyor; and
   additional guide rollers of a type of said guide rollers, said additional guide rollers forming part of a deflecting means outside said angle area in the area of the longitudinal end of said second twin-belt conveyor, which adjoins said first twin-belt conveyor, said additional guide rollers being accommodated and fastened in a separate bottom plate as an assembly unit, said separate bottom plate being arranged adjoining said angle area in the area of the longitudinal end of said second twin-belt conveyor in the extension of and/or between said two circulating belts of said second twin-belt conveyor.

9. A conveying device for conveying an individually packaged product, the conveying device comprising:
   a first conveying section comprising a first twin-belt conveyor with two lateral, endlessly driven circulating belts;
   a second conveying section comprising a second twin-belt conveyor with two lateral, endlessly driven circulating belts, said second conveying section being differently directed from said first conveying section for a change in direction of conveying, said second twin-belt conveyor directly adjoining a longitudinal end of said first twin-belt conveyor laterally at an angle and the longitudinal end of said circulating belts of said first twin-belt conveyor extends in an angle area into the extension of the conveyor track of said second twin-belt conveyor at least up to a middle of the conveyor track of said second twin-belt conveyor;

a transfer device for transferring the individually packaged product being conveyed from the first conveying section to the second conveying section, said transfer device comprising obliquely directed, non-driven guide rollers provided in said angle area between the two circulating belts of said first twin-belt conveyor, said lateral circulating belts of each of said first twin-belt conveyor and said second twin-belt conveyor forming the only drive means of said conveying device, said obliquely directed, non-driven guide rollers defining an exclusive deflecting means in said angle area for deflecting the individually packaged product being conveyed from said first twin-belt conveyor on a curved path to said second twin-belt conveyor, longitudinal end of said circulating belts of said first twin-belt conveyor extending up to said middle or just beyond said center of the extension of the conveyor track of said second twin-belt conveyor; and at least one of said guide rollers is aligned or nearly aligned with the conveyor track of said second twin-belt conveyor and is provided in the extension of said circulating belt of said first twin-belt conveyor, which said circulating belt of said first twin-belt conveyor is adjacent to said second twin-belt conveyor.

10. A conveying device for conveying an individually packaged product, the conveying device comprising:

a first conveying section comprising a first twin-belt conveyor with two lateral, endlessly driven circulating belts;

a second conveying section comprising a second twin-belt conveyor with two lateral, endlessly driven circulating belts, said second conveying section being differently directed from said first conveying section for a change in direction of conveying, said second twin-belt conveyor directly adjoining a longitudinal end of said first twin-belt conveyor laterally at an angle and the longitudinal end of said circulating belts of said first twin-belt conveyor extends in an angle area into the extension of the conveyor track of said second twin-belt conveyor at least up to a middle of the conveyor track of said second twin-belt conveyor;

a transfer device for transferring the individually packaged product being conveyed from the first conveying section to the second conveying section, said transfer device comprising obliquely directed, non-driven guide rollers provided in said angle area between the two circulating belts of said first twin-belt conveyor, said lateral circulating belts of each of said first twin-belt conveyor and said second twin-belt conveyor forming the only drive means of said conveying device, said obliquely directed, non-driven guide rollers defining an exclusive deflecting means in said angle area for deflecting the individually packaged product being conveyed from said first twin-belt conveyor on a curved path to said second twin-belt conveyor;

additional guide rollers of a type of said guide rollers, said additional guide rollers forming part of a deflecting means outside said angle area in the area of the longitudinal end of said second twin-belt conveyor, which adjoins said first twin-belt conveyor, said additional guide rollers being accommodated and fastened in a separate bottom plate as an assembly unit, said separate bottom plate being arranged adjoining said angle area in the area of the longitudinal end of said second twin-belt conveyor in the extension of and/or between said two circulating belts of said second twin-belt conveyor;

said bottom plate and said separate bottom plate have recesses, through which said guide rollers and said additional slightly guide rollers respectively project upward with a projection; and said guide rollers and said additional slightly guide rollers are brought into a rolling guiding meshing with the bottom side of said individually packaged product.

* * * * *